Sept. 20, 1971 — R. L. CHRISTY — 3,605,190
EXTRUDER CROSSHEAD
Filed June 24, 1969 — 2 Sheets-Sheet 1

INVENTOR
RAYMOND L. CHRISTY

BY Oberlin, Maky, Donnelly & Renner
ATTORNEYS

Sept. 20, 1971     R. L. CHRISTY     3,605,190
EXTRUDER CROSSHEAD
Filed June 24, 1969     2 Sheets-Sheet 2
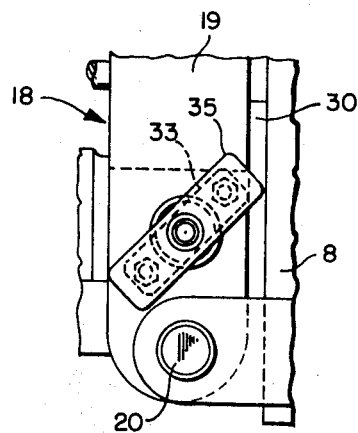
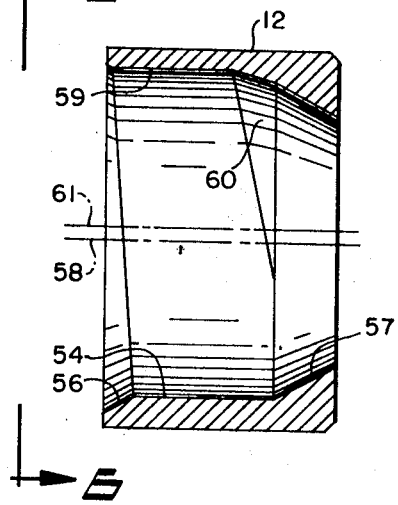
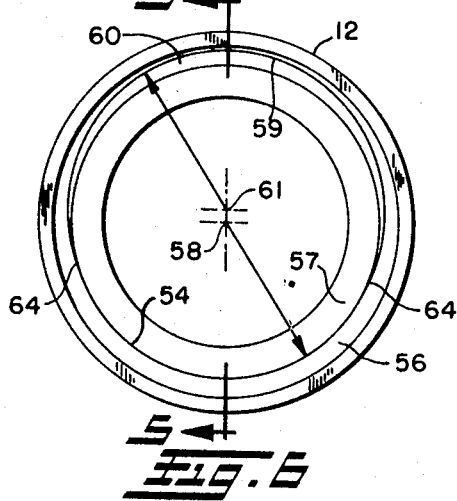
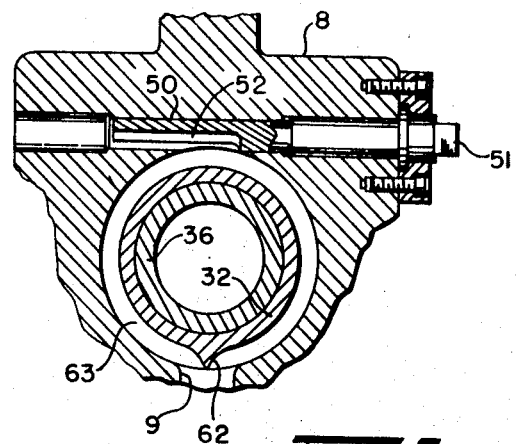
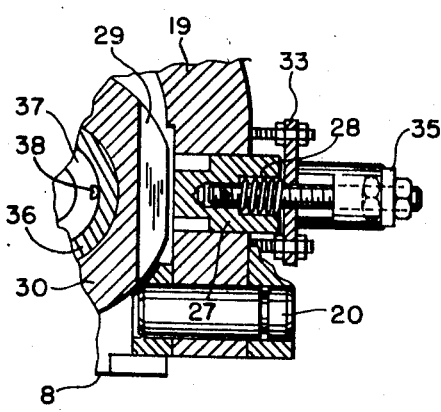
INVENTOR
RAYMOND L. CHRISTY
BY
Oberlin, Maky, Donnelly & Renner
ATTORNEYS

United States Patent Office 3,605,190
Patented Sept. 20, 1971

3,605,190
EXTRUDER CROSSHEAD
Raymond L. Christy, Akron, Ohio, assignor to
NRM Corporation, Akron, Ohio
Filed June 24, 1969, Ser. No. 835,982
Int. Cl. B29f 3/00
U.S. Cl. 18—13H
9 Claims

ABSTRACT OF THE DISCLOSURE

An extruder cross head for extruding plastic material onto a core which travels longitudinally through an annular die passage defined by inner and outer dies characterized in the provision of a lever actuated mandrel which is wedged into and released from a tapered bore in the crosshead body, and a lever-actuated core guide and inner die sleeve which is longitudinally slidable in the mandrel for adjustment of the inner die with respect to the outer die. The inner die has internal portions for wrench engagement to avoid marring or distortion of the die and core guide surfaces thereof during assembly and disassembly of the sleeve and inner die. The extruder crosshead herein also has controllable bleed means opposite the lateral material inlet and has a flow equalizer ring around the tip of the mandrel which includes concentric and eccentric bore portions to equalize the flow of material through the annular die passage.

BACKGROUND OF THE INVENTION

In known extruder crossheads, it is one common practice to form integrally in the crosshead body a curved shoulder (around the bore through which the core guide sleeve is inserted) which causes the plastic material to be turned as it enters the lateral inlet and to be transformed from solid stream form to tubular form as it flows around the portion of the core guide sleeve which extends longitudinally forwardly of said shoulder toward the die. As is evident, it is difficult and expensive to form and to clean the curved shoulder aforesaid. Instead of forming the curved shoulder integrally in the crosshead body as aforesaid, it has been proposed heretofore to bolt a cylindrical mandrel sleeve having a curved annular end face in a close fitting cylindrical bore in the crosshead body. Although this expedient may facilitate manufacture, leakage of plastic material between mandrel sleeve and the crosshead body bore may render it a difficult and time-consuming task to remove the mandrel sleeve from the crosshead body when it is desired to clean the mandrel and the crosshead body.

SUMMARY OF THE INVENTION

Contrary to the foregoing, the extruder crosshead herein has a lever-actuated tapered mandrel which is tightly wedged into a tapered bore in the crosshead body and which is readily broken loose from the tapered bore for removal of the mandrel for cleaning or other service. The mandrel further comprises a lever-actuated sleeve therewithin which replaceably mounts an inner die and core guide member, said member being assembled to, and disassembled from, the sleeve from the interior of the sleeve to avoid marring and distortion of the die and core guide surfaces. These are some of the objects of this invention.

Another object of this invention is to provide an extruder crosshead wherein a flow equalizer ring is replaceably mounted in the crosshead body to define with the portion of the mandrel spaced within the ring an annular passage which is of variable radial width to equalize the flow of plastic material into the annular die passage.

Yet another object of this invention is to provide an extruder crosshead having controllable bleed means opposite the lateral material inlet to prevent stagnation where the streams of material first come together during transformation from solid stream form to tubular form.

Other objects and advantages of the present invention will become apparent as the following description proceeds.

BRIEF DESCRIPTION OF THE DRAWINGS

FIG. 1 is a central horizontal cross-section view of an extruder crosshead embodying the present invention;

FIGS. 2 to 7 are cross-section views or elevation views taken along the respective lines 2—2 to 7—7, lines 2—2, 3—3, and 7—7 appearing in FIG. 1, line 4—4 appearing in FIG. 2, line 5—5 appearing in FIG. 6, and line 6—6 appearing in FIG. 5; and FIG. 8 illustrates the retracted position of one of the two mandrel engaging pins.

Figures 1, 2, 3:
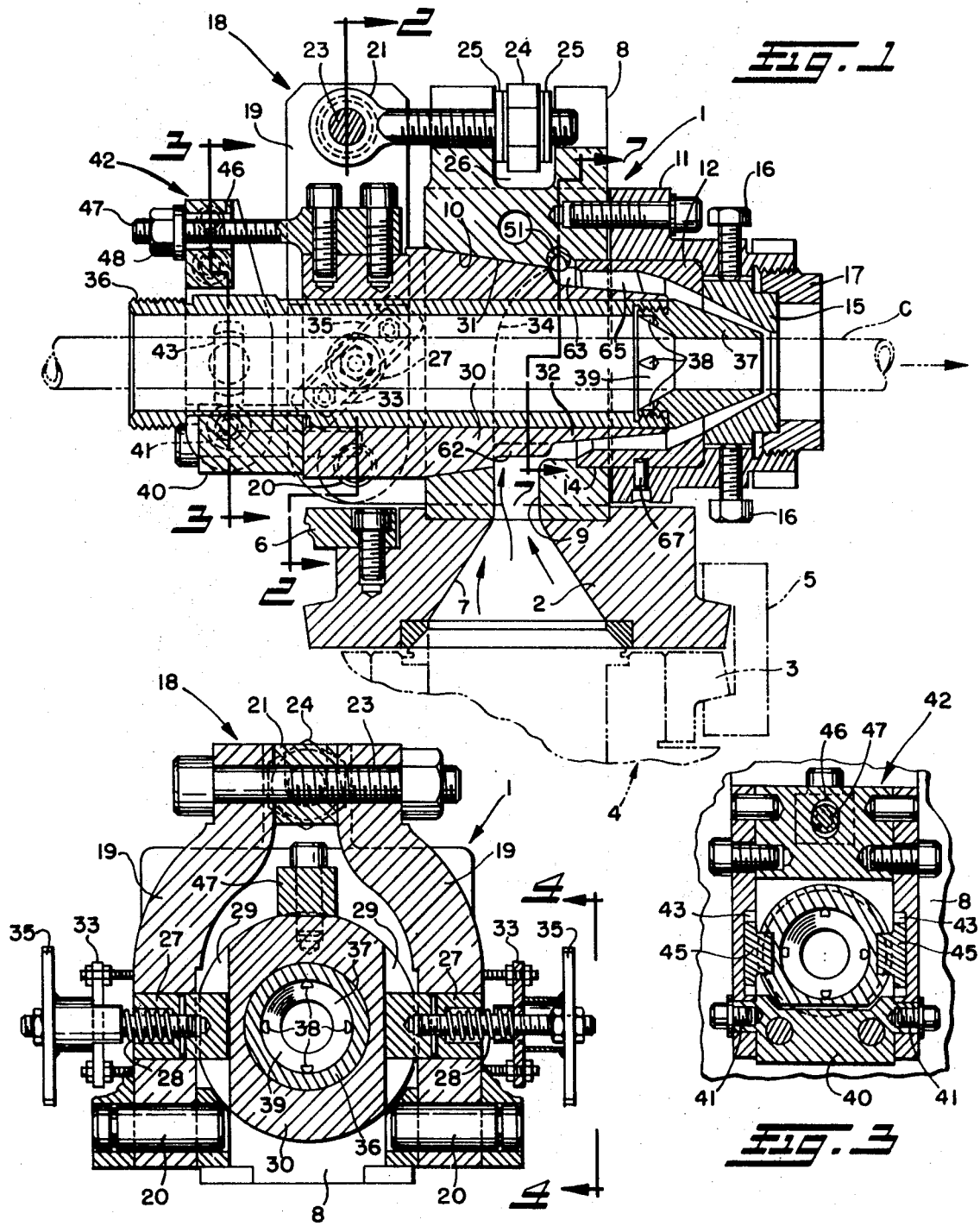

The extruder crosshead 1 shown in the drawings comprises a flanged ring 2 which is adapted to be clamped to the flanged ring 3 of an extruder 4 as by means of a suitable clamp 5. The ring 2 may be hinged to the extruder 4 as by means of the crosshead support arm 6. The ring 2 has a passage 7 to receive plastic material from the extruder 4.

Bolted or otherwise secured to the ring 2 is the crosshead body 8 which has an inlet passage 9 registering with the passage 7 in ring 2 and leading into the tapered bore 10 in said body 8. Bolted onto the one side of the crosshead body is a die retainer 11 which has therein a choke or flow equalizer ring 12 which is seated by said retainer 11 in a counterbore 14 in the crosshead body 8. In engagement with the outer end of the ring 12 is an outer die 15 which may be radially adjusted by manipulating the screws 16, the outer die 15 being clamped against the choke ring 12 as by means of the threaded ring 17 in retainer 11.

A lever assembly 18 comprising a pair of lever arms 19 is pivotally mounted to the crosshead body 8 by the pins 20 and has a swing bolt 21 mounted on pivot 23 at the upper end of said arms 19. It can be seen from FIG. 1, that when the nut 24 (and thrust washers 25) on the swing bolt 21 are positioned between the sides of the slot 26 in the top of the crosshead body 8, the turning of the nut 24 in opposite directions will cause swinging of the arms 19 in opposite directions about the pins 20.

On each lever arm 19 is a mandrel engaging pin 27 which is actuated by spring 28 into engagement with a corresponding transverse slot 29 in the mandrel 30. Each pin 27 preferably has parallel flats to engage the parallel sides of the slot 29. The mandrel 30 has a tapered portion 31 which is complemental with the tapered bore 10 in the crosshead body 8 and a reduced diameter inner end portion 32 which extends axially into the choke ring 12 and which defines the curved shoulder 34 along which the material travels from the inlet 9 to the space between the mandrel portion 32 and the bore of the choke ring 12.

As evident from the description thus far, when the nut 24 on the swing bolt 21 is turned to move it toward the left (FIG. 1), the mandrel 30 will be tightly wedged in the tapered bore 10 in the crosshead body 8 by clockwise swinging of the lever assembly 18. When it is desired to release the mandrel 30 from wedged engagement in the crosshead body 8, the turning of the nut 24 in the opposite direction will cause the mandrel 30 to be pulled free of the tapered bore 10. The mandrel engaging pins 27 are spring-loaded as aforesaid and when the handles 35 thereof are pulled outwardly, the pins 27 are disengaged from the mandrel slots 29, and when the handles 35 are turned as shown in FIG. 8 to engage the plates 33, the pins 27 are held in retracted position to facilitate removal of the entire mandrel assembly.

Extending through the mandrel 30 is a sleeve 36 which has threadedly engaged therewith an inner die and core guide 37 which extends concentrically within the choke ring 12 and outer die 15. In order to tightly secure the inner die 37 to the sleeve 36 without danger of marring or deforming the exterior die surface and the interior guide surface for a core C viz, a hose, a pipe, a cable, etc., the inside of said inner die 37 is made by drilling several holes 38 therein, four for example, and providing a conical bore 39 intersecting holes 38 as shown for insertion of a wrench (not shown) having a frusto-conical end to fit bore 29 and provided with cross pins having semicylindrical ends fitting into the notches 38. In this way, the inner die 37 may be secured to and removed from sleeve 36 without touching the die or core guide surfaces.

Bolted or otherwise secured on the rear end of the mandrel 30 is a trunnion body 40 which provides pivots 41 for a lever assembly 42 which has slots 43 in which the T-head pins 45 are slidably mounted with the inner ends of the pins 45 fitting into circular recesses formed in opposite sides of the sleeve 36.

The upper end portion of the lever assembly 42 has an oblong opening 46 through which the bolt 47 on mandrel 30 loosely extends. As evident, when the nut 48 on the bolt 47 is tightened, the assembly 42 will be swung clockwise as viewed in FIG. 1, whereby the inner die 37 may be accurately adjusted toward the outer die 15. When the nut 48 is loosened, the back pressure of the plastic material acting on the inner die 37 will urge the sleeve 36 rearwardly with the lever assembly 42 contacting nut 48. If positive retraction of sleeve 36 is desired, another nut 48 may be provided on the opposite side of the lever assembly 42.

The crosshead body 8, as best shown in FIG. 7, has a passage 50 therethrough which is tangential to the crosshead bore adjacent to the downstream end of shoulder 34 and diametrically opposite the plastic inlet 9. Rotatably adjustable in said passage is a bleed valve member 51 having a longitudinal groove 52 through which plastic material may flow for bleeding of the passage as when the exterior and crosshead operation is started. Once the extrusion operation has started, the bleed valve member 51 may be turned to close the bleed passage 50 or to permit controlled bleeding to prevent stagnation of plastic material where the streams first meet.

With reference to the choke ring 12, it is preferably made as shown in FIGS. 5 and 6 wherein the portion 54 of the choke ring bore including the tapered portions 56 and 57, is concentric with the ring 12 and dies 37 and 15 with its center at 58, whereas, the cylindrical bore portion 59 including tapered portion 60 has its center at 61. The mandrel 30 has a flow divider rib 62 (see FIGS. 1 and 7) at the inlet 9 which splits the flow of plastic material circumferentially away from the inlet 9 through passage 63, and the eccentric portion 59 provides a progressively increasing flow area from the areas 64 to the side of the passage 65 opposite to the inlet 9. In this way, flow of plastic material through the passage 65 into the annular die passage between dies 15 and 37 is equalized. A pin 67 in the die retainer 11 assures proper assembly of the choke ring 12 with respect to the inlet 9.

I, therefore, particularly point out and distinctly claim as my invention:

1. In an extruder crosshead of the type wherein a crosshead body has an inlet passage for flow of plastic material from an extruder into an annular die passage defined by a crossbore through said body and a mandrel in said crossbore whereby plastic material may be extruded onto a core which is adapted to be moved longitudinally through said mandrel, the improvement which comprises a tapered portion on said mandrel interfitting a tapered portion of said crossbore; and mandrel actuating means movably suported on said body and engaged with said mandrel to tightly wedge said mandrel into said body and to release said mandrel from said body responsive to movement of said mandrel actuating means; said interfitting tapered portions of said mandrel and crossbore being immediately adjacent to said annular die passage.

2. The extruder crosshead of claim 1 wherein said mandrel actuating means includes lever means pivoted on said body and operative to actuate said mandrel as aforesaid responsive to swinging of said lever means in opposite directions.

3. The extruder crosshead of claim 2 wherein pins on said lever means are engaged in diametrically opposite slots of said mandrel to transmit axial force to said mandrel responsive to swinging of said lever means.

4. The extruder crosshead of claim 1 wherein a sleeve extends through said mandrel and has a die and core guide member screwed into one end thereof which defines the radially inner wall of said die passage and has a core guide bore therethrough; wherein said sleeve has, at its other end, means for longitudinally adjusting said sleeve with respect to said mandrel thus to vary the radial width of said die passage; and wherein said member has internal wrench engaging portions radially beyond said core guide bore which are accessible from said other end of said sleeve whereby said member may be secured to and removed from said sleeve without marring or distorting said radially inner wall of said die passage or said core guide bore.

5. The extruder crosshead of claim 1 wherein said crossbore has a tangentially disposed bleed passage opposite said inlet passage; and wherein a bleed valve member is rotatably disposed in said bleed passage and has a longitudinal groove which in different rotary positions of said bleed valve member controls or prevents bleeding of plastic material through said bleed passage as the material flows toward said annular die passage.

6. In an extruder crosshead of the type wherein a crosshead body has an inlet passage for flow of plastic material from an extruder into an annular die passage via a curved passage for transforming the plastic material from solid stream form to tubular stream form defined by a crossbore through said body and a mandrel in said crossbore having a curved shoulder portion which defines an end wall of said curved passage whereby plastic material may be extruded onto a core which is adapted to be moved longitudinally through said mandrel, the improvement which comprises a flow equalizer ring clamped in said crossbore to define with the portion of said mandrel adjacent said shoulder an annular passage communicating with said inlet passage and with said die passage at its opposite ends; said ring having merging coaxial and eccentric bore portions of which the latter makes said annular passage in a plane transverse to the axis of said ring and mandrel of progressively increasing radial width circumferentially toward the side of said annular passage which is opposite to said inlet passage whereby flow of plastic material into and through said die passage is equalized by reason of decreased pressure drop circumferentially around said mandrel portion.

7. The extruder crosshead of claim 6 wherein said eccentric bore portion has for a portion of its axial length an eccentric tapered portion which merges with tapered coaxial portions of said annular die passage.

8. The extruder crosshead of claim 4, wherein said wrench engaging portions comprise a tapered bore adjacent to said core guide bore and axial holes intersecting said tapered bore.

9. In an extruder crosshead of the type wherein a crosshead body has an inlet passage for flow of plastic material from an extruder into an annular die passage defined by a crossbore through said body and a mandrel in said crossbore whereby plastic material may be extruded onto a core which is adapted to be moved longitudinally through said mandrel, the improvement which comprises a tapered portion on said mandrel interfitting a tapered portion of said crossbore; and mandrel actuating means comprising lever means pivoted on said body and having pins engaged in diametrically opposite slots of said mandrel to transmit axial force to said mandrel responsive to swinging of said lever means thus to tightly wedge said mandrel into said body and to release said mandrel from said body, said pins being retractable from said slots for complete withdrawal of said mandrel from said body.

References Cited

UNITED STATES PATENTS

| | | |
|---|---|---|
| 3,206,802 | 9/1965 | Van Riper. |
| 3,221,371 | 12/1965 | Stevens _____ 18—14 |
| 3,311,952 | 4/1967 | Kovach et al. |

H. A. KILBY, Jr., Primary Examiner

U.S. Cl. X.R.

18—13T